(No Model.)

C. KAESTNER.
FRICTION CLUTCH.

No. 328,786. Patented Oct. 20, 1885.

Witnesses:
Chas. L. Carman
W. C. McArthur

Inventor:
Charles Kaestner
per
H. Harrison
Attorney.

N. PETERS, Photo-Lithographer, Washington, D. C.

UNITED STATES PATENT OFFICE.

CHARLES KAESTNER, OF CHICAGO, ILLINOIS.

FRICTION-CLUTCH.

SPECIFICATION forming part of Letters Patent No. 328,786, dated October 20, 1885.

Application filed August 3, 1885. Serial No. 173,392. (No model.)

*To all whom it may concern:*

Be it known that I, CHARLES KAESTNER, a citizen of the United States, residing at Chicago, in the county of Cook and State of Illinois, have invented certain new and useful Improvements in Friction-Clutches, of which the following is a specification, to wit:

This invention relates to friction-clutches; and it consists in certain peculiarities of the construction and arrangement of the same, substantially as will hereinafter be more fully described and claimed.

In order to enable others skilled in the art to which my invention pertains to make and use the same, I will now proceed to describe its construction and operation, referring to the accompanying drawings, in which—

Figure 1:
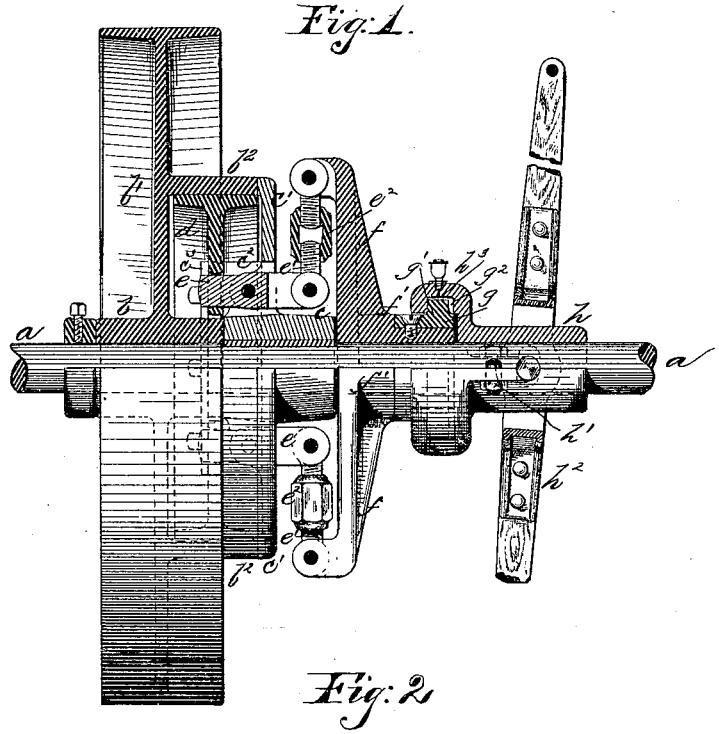
Figure 2:
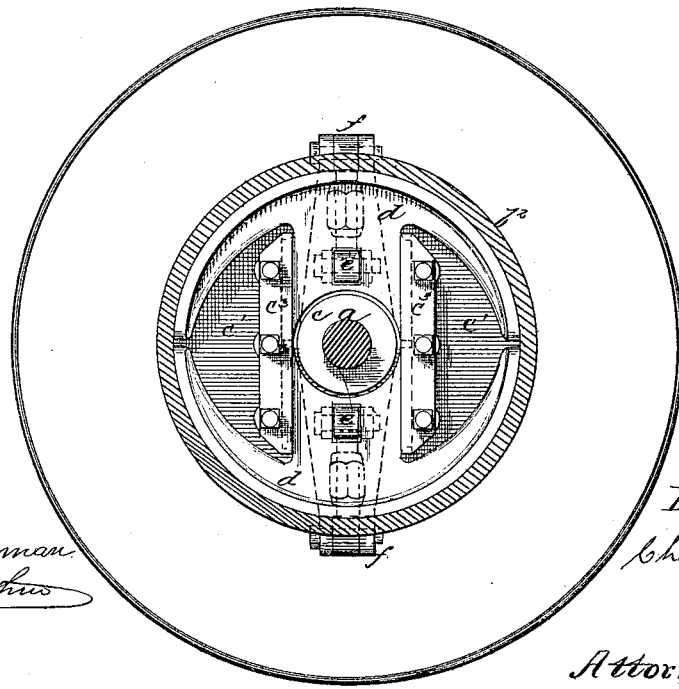

Figure 1 is a side elevation, partly in section, of my invention, and Fig. 2 is a vertical transverse section of the same.

$a$ represents a driving-shaft on which is loosely mounted my clutch-driving disk, which is herein shown as forming a part of a belt-pulley, but which may of course be simply a disk for driving the shaft, as desired, and hereinafter explained. This clutch-disk consists of a hub, $b$, formed or provided with a circular flange or radial arms, $b'$, on the periphery of which is carried the circular clutch-flange $b^2$, parallel with the hub and shaft, as clearly shown in Fig. 1.

Close to the hub $b$ is a second hub, $c$, fast upon the shaft and provided with an annular plate, $c'$, which lies at its periphery close against the adjacent edge of the clutch-flange $b^2$, and is provided with arms $c^2$, projecting into the loose clutch-disk and having upon their ends two or more guides, $c^3$, which are arranged at right angles to the main shaft, and in which are carried the friction-shoes $d$, which slide radially to and from the shaft a short distance, and have their peripheral faces turned off to closely fit the inner face of the clutch-flange $b^2$, as in Fig. 2. These shoes are thrown in or out as desired by means of small rock-levers $e$, the ends of which are engaged with said shoes, and which are fulcrumed in the annular plate $c'$, or in the supporting-arms thereon. The inner ends of these rock-levers are connected by links or toggles $e'$, with a pair of radial arms, $f$, as shown, and in order that the pressure on the shoes may be regulated as desired, the toggle-links are made in two parts, provided with right and left hand threads, and united by a nut, as at $e^2$ in Fig. 1. The arms $f$ are carried by a sliding hub, $f'$, on the shaft, the rear end of which is surrounded by a steel ring, $g$, formed with a peripheral flange, $g'$, to form a lasting wearing-surface for the shipping device, and as indicated in the drawings this ring is secured by screws or similar means to enable it to be replaced at any time when it becomes worn.

The shipper consists of a collar, $h$, made in two parts and secured around the shaft by bolts $h'$, as in Fig. 1, and slides loosely on the shaft by means of a shipping-lever, $h^2$, pivoted at any desirable point, and connected to the shipping-collar, as shown. This collar is on its forward end formed with an enlargement, which overlaps the adjacent end of the hub $f'$, and is formed with an interior groove, $h^3$, in which the flange $g'$ is received and held. It will be observed that this flange does not quite fill the groove, and is cut away on one side, as at $g^2$, to form an oil-chamber, so that the flange always runs in oil and is perfectly lubricated.

In operation the belt-pulley, having the female portion of the clutch attached, runs loosely on the shaft and is always in operation. When it is desired to start the shaft and the machinery connected to it, the shipping-lever is thrown over, pushing forward the radial arms $f$, and by their toggle-links and rock-levers throwing the shoes out against the clutch-flange with pressure sufficient to start and drive the shaft. It will also be seen that this pressure is not applied suddenly, but gradually, the friction being at first sufficient to start the shaft and afterward to carry it forward at the same speed as the pulley, thus effecting an easy starting of the machinery, with none of the strain consequent upon at once starting it at full speed. The wear upon the face of the shoes is taken up in the extension toggle-links, and I prefer to so adjust these links in connection with the shifting of the radial arms that when these arms are fully thrown forward the outer ends of the links will be carried just over the center, and thus the clutch be held firmly till the machines are to be stopped, when the lever is reversed and the shoes at once withdrawn from contact with the clutch-pulley.

I have herein shown the clutch as applied to a driving-pulley; but it will be evident at once that no change in the construction is needed to adapt it to different uses. Thus the belt or pulley face of the clutch may be omitted, and the female portion of the clutch be secured upon a separate shaft, aligned with the one represented, to transmit power from one to the other, and it will make no difference whether the power is transmitted to or from the clutch-pulley; neither do I desire to confine myself to the number of radially-sliding shoes herein represented, as, with the requisite number of guides, three, four, or more may be used, as found desirable for special work. The plate $e'$ is also but a means of supporting and carrying the shoes and rock-levers, and could just as readily be replaced by radial arms, if found desirable for any purpose.

Having thus fully described my invention, what I claim as new, and desire to secure by Letters Patent, is—

1. In a friction-clutch, the combination, with an annular clutch-flange and a series of shoes sliding radially to and from the inner face of said flange, of a series of rock-levers connected at one end to the shoes and at the other connected by toggle-links to radial arms sliding on the shaft to and from the clutch, substantially as and for the purpose set forth.

2. In a clutch, the combination, with the laterally-sliding and rotating clutch member, of a flanged wearing-ring removably attached thereto, and a shipping-collar sliding laterally on the shaft and formed with an interior groove to receive and hold the flange on said ring, substantially as and for the purpose set forth.

3. The combination, with a shaft and a laterally-sliding loose shifting-collar thereon, formed with an interior annular groove, of a sliding and rotating clutch member provided with a flange for engagement with the grooved collar, said flange being cut away slightly at its periphery and one side to leave a space within the groove to form an oil-chamber, substantially as shown and described.

In testimony whereof I affix my signature in presence of two witnesses.

CHARLES KAESTNER.

Witnesses:
W. C. McARTHUR,
W. S. McARTHUR.